United States Patent
Trehan (10) Patent No.: US 12,549,784 B2
(45) Date of Patent: Feb. 10, 2026

(54) METHOD AND SYSTEM OF GENERATING ON-DEMAND VIDEO OF INTERACTIVE ACTIVITIES

(71) Applicant: Rajiv Trehan, Bangkok (TH)

(72) Inventor: Rajiv Trehan, Bangkok (TH)

(73) Assignee: RAJIV TREHAN, Bangkok (TH)

( * ) Notice: Subject to any disclaimer, the term of this patent is extended or adjusted under 35 U.S.C. 154(b) by 0 days.

(21) Appl. No.: 18/141,993

(22) Filed: May 1, 2023

(65) Prior Publication Data

US 2023/0353798 A1      Nov. 2, 2023

Related U.S. Application Data (60) Provisional application No. 63/336,757, filed on Apr. 29, 2022.

(51) Int. Cl.
| | |
|---|---|
| *H04N 21/234* | (2011.01) |
| *G06V 10/74* | (2022.01) |
| *H04N 21/25* | (2011.01) |
| *H04N 21/43* | (2011.01) |
| *H04N 21/845* | (2011.01) |

(52) U.S. Cl.
CPC ..... *H04N 21/23424* (2013.01); *G06V 10/761* (2022.01); *H04N 21/251* (2013.01); *H04N 21/43072* (2020.08); *H04N 21/8456* (2013.01)

(58) Field of Classification Search
CPC ....... H04N 21/23418; H04N 21/23424; H04N 21/251; H04N 21/25891; H04N 21/2668; H04N 21/4302; H04N 21/43072; H04N 21/44218; H04N 21/6582; H04N 21/8456; H04N 21/8549
See application file for complete search history.

(56) References Cited

U.S. PATENT DOCUMENTS

| | | | |
|---|---|---|---|
| 2016/0037217 A1* | 2/2016 | Harmon | H04N 21/4542 725/9 |
| 2019/0373330 A1* | 12/2019 | Bloch | H04N 21/4532 |
| 2021/0204030 A1* | 7/2021 | Wu | H04N 21/42224 |
| 2021/0409811 A1* | 12/2021 | Sen | H04N 21/2668 |
| 2023/0232074 A1* | 7/2023 | Ramaswamy | H04N 21/472 725/29 |
| 2023/0328298 A1* | 10/2023 | Kim | H04N 21/23418 725/143 |
| 2024/0064346 A1* | 2/2024 | Xia | G06V 40/171 |

* cited by examiner

*Primary Examiner* — Rong Le (74) *Attorney, Agent, or Firm* — Kendal M. Sheets (57) ABSTRACT

A method and system for generating on-demand video is disclosed. The method includes creating a plurality of video snippets from a plurality of videos comprising trainer performed activities. The method further includes generating a set of input vectors for at least one activity dimension based on a predetermined on-demand preferences. For each of the at least one activity dimension, the set of input vectors are compared with a set of activity vectors associated with each of the plurality of video snippets, and a distance between each of the set of input vectors relative to the set of activity vectors is determined. A set of video snippets is identified where the distance is below a predefined threshold. The identified set of video snippets are combined according to at least one of the predetermined on-demand preferences, and the on-demand video is generated.

12 Claims, 6 Drawing Sheets

METHOD AND SYSTEM OF GENERATING ON-DEMAND VIDEO OF INTERACTIVE ACTIVITIES

TECHNICAL FIELD

The invention relates to on-demand videos. More specifically, the invention relates to a method and system of generating on-demand video of interactive activities for users.

BACKGROUND

In today's word, where rich online content is available at a click or touch of a button, numerous videos are available on the web that provide a viewer, instructions to perform various activities. These activities, for example, may include but are not limited to various types of workouts, dance, yoga, knitting, playing specific games, playing music instruments, or the like. A user based on his/her interest may decide when to watch a specific video and perform the activity given therein. To this end, the user may follow the steps provided in the video to perform the activity in the video.

Since the video is not dynamic and is pre-recorded, while the video is being played, the user may not be able to match pace, speed, actions, voice, etc., may not match with the pace, speed, or actions displayed in the video. This may lead to a mismatch between actions performed by the user when compared to those performed in the video. Thus, the user may have to ultimately stop or replay the video Such videos may also provide static feedback to the user that may be rendered at pre-decided intervals in the video. The feedbacks may for example be provided as "WE ARE HALFWAY THERE", or "GOOD WORK", "TWO MORE REPS", "HOME STRETCH", or the like. However, when the user's actions are not in synch with those performed in the video, the static feedback may be of no use. Moreover, since the number or repetitions and variance in pre-recorded videos are fixed, a user may not be able to use the pre-recorded video for a customized activity performance. In other words, there cannot be any variance between user's performance of the activity and those performed in the pre-recorded video.

Some conventional systems also provide live and interactive video sessions to the users, where a trainer performs an activity remotely and the user follows the steps thereof. However, this interaction may be one to many and additionally, there may be video quality and lagging problems most of the times. As a result, the user may not have a satisfying and fulfilling experience.

Thus, there is a need for a method and a system to generate multiple on-demand videos of interactive activities which provides the user a flexibility for synchronizing the on-demand video with respect to the user performance.

SUMMARY

In an embodiment, a method for generating on-demand videos is disclosed. The method includes creating, by a multimedia processing model, a plurality of video snippets from a plurality of videos including activities performed by a trainer. The method includes generating, by the multimedia processing model, a set of input vectors for at least one activity dimension based on a set of predetermined on-demand preferences. Further, comparing for each of the at least one activity dimension, by the multimedia processing model, each of the set of input vectors with a set of activity vectors associated with each of the plurality of video snippets. The method may include determining for each of the at least one activity dimension, by the multimedia processing model, distance of each of the set of input vectors relative to the set of activity vectors associated with each of the plurality of video snippets. The method includes identifying, by the multimedia processing model, a set of video snippets from the plurality of video snippets. The distance as determined for the set of video snippets relative to the set of activity vectors associated with each of the plurality of video snippets may be below a first predefined threshold. The method may further include combining, by the multimedia processing model, the set of video snippets based on at least one of the set of predetermined on-demand preferences and thereby generating, by the multimedia processing model, an on-demand video based on the combining.

In another embodiment, a method for creating video snippets is provided. The method may include processing via a multimedia processing model a video including at least one activity performed by at least one trainer. Further, determining by the multimedia processing model a set of activity dimensions in the video, based on the processing. The method may include determining by the multimedia processing model, a plurality of activity vectors for each of the set of activity dimensions, based on processing of the video and iteratively computing by the multimedia processing model for each of the set of activity dimension, a distance between a first set of activity vectors and a second set of activity vectors. The first set of activity vectors are determined at the first time instant in the video and the second set of activity vectors are determined at a second time instant in the video. The first time instant and the second time instant are separated by a predefined time interval. In an embodiment, the method may further include comparing by the multimedia processing model at each iteration for each of the set of activity dimensions, the computed distance with a predefined distance threshold. The multimedia processing model may further determine certain set of points in the video in response to the comparing, such that each of the set of points corresponds to a time instant in the video where the computed distance is greater than the predefined distance threshold. The method includes generating by the multimedia processing model a plurality of video snippets from the video based on the set of points.

In another embodiment, a system for generating on-demand video is disclosed. The system includes a processor and a memory. The memory of the system is communicatively coupled to the processor. The memory stores processor-executable instructions which on execution causes the processor to create a plurality of video snippets from a plurality of videos including activities performed by a trainer. The processor may generate a set of input vectors for at least one activity dimension based on a set of predetermined on-demand preferences. Further, the processor compares for each of the at least one activity dimension each of the set of input vectors with a set of activity vectors associated with each of the plurality of video snippets. The processor may further determine for each of the at least one activity dimension, distance of each of the set of input vectors relative to the set of activity vectors associated with each of the plurality of video snippets. The processor is configured to identify a set of video snippets from the plurality of video snippets. The distance determined for the set of video snippets relative to the set of activity vectors associated with each of the plurality of video snippets may be below a first predefined threshold. The processor may further combine the set of video snippets based on at least one of the set of predetermined on-demand preferences. The processor is thus configured to generate an on-demand video based on the combining. In yet another embodiment, a system for creating video snippets is provided. The system includes a processor and a memory. The memory is communicatively coupled to the processor to store processor-executable instructions, which, on execution, causes the processor to process a video including at least one activity performed by at least one trainer. The processor may determine a set of activity dimensions in the video, based on the processing. The processor may further determine a plurality of activity vectors for each of the set of activity dimensions, based on processing of the video. The processor is configured to iteratively compute for each of the set of activity dimension, a distance between a first set of activity vectors and a second set of activity vectors. The first set of activity vectors are determined at a first time instant in the video and the second set of activity vectors are determined at a second time instant in the video. The first time instant and the second time instant are separated by a predefined time interval. The processor is further configured to compare at each iteration for each of the set of activity dimensions, the computed distance with a predefined distance threshold. The processor may determine a set of points in the video in response to the comparing, that each of the set of points corresponds to a time instant in the video having the computed distance greater than the predefined distance threshold. The processor generates a plurality of video snippets from the video based on the set of points.

It may be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, explain the disclosed principles.

DETAILED DESCRIPTION OF THE DRAWINGS

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

The following description is presented to enable a person of ordinary skill in the art to make and use the invention and may be provided in the context of an application and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skilled in the art will realize that the invention might be practiced without the use of these specific details. In other instances, well-known structures and devices are shown in block diagram form in order not to obscure the description of the invention with unnecessary detail. Thus, the invention is not intended to be limited to the embodiments shown but is to be accorded the widest scope consistent with the principles and features disclosed herein.

While the invention is described in terms of examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to be one of ordinary skills in the art. Additionally, memory or other storage, as well as communication components, may be employed in embodiments of the invention.

Figure 1:
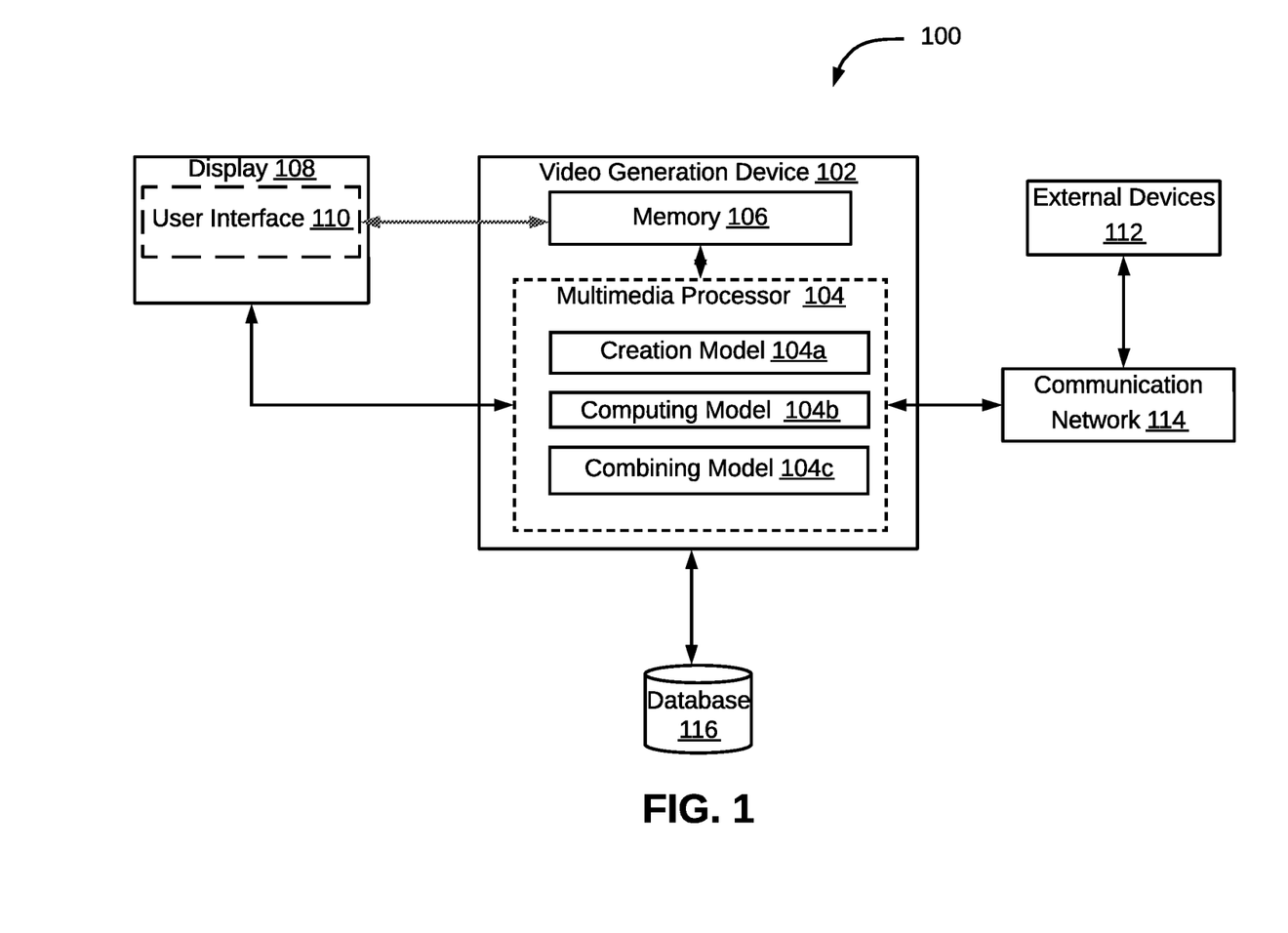
FIG. 1 is a block diagram illustrating a system for generating on-demand video, in accordance with some embodiments.

Referring now to FIG. 1, a block diagram of system 100 for generating an on-demand video of targeted interactive activities is illustrated, in accordance with some embodiments. System 100 may include a video generation device 102 that may generate on-demand videos of targeted interactive activities. Examples of the video generation device 102 may include, but are not limited to, cloud, a server, a desktop, a laptop, a notebook, a tablet, a smartphone, a mobile phone, an application server, or the like. A targeted interactive activity, may include, but is not limited to, a sports activity which involves certain level of physical exertion, including, but not limited to walking, gymming, athletics, running, cycling, soccer, yoga, fitness, Zumba, aerobics, freeze dance, or any other sports games, or any high intensity interval training (HIIT), intense workout, strength training exercises including, but not limited to weight lifting exercises, weight training, resistance training, agile strengthening, speed training, speed strengthening, push-ups, pull-ups, crunches, leg squats or push-ups against a wall, lateral squats, lunges, squats, burpees, biceps, triceps, dumbbell squat press, dumbbell bench press, heel rocks, one legged deadlift, core scissors, elbow knee, a band lateral raise, glute bridge, a band lateral stretch, a hook, an uppercut, boxing, kettlebell, deadlift, dead bug, squat thrusters, or the like.

In an embodiment, the targeted interactive activity may also include other types of homely activities such as knitting, needlework, sewing, handcrafting, textile working, crochet, working with a shuttle, hook working, tatting, or the like. The activity may include any musical learning activity, or any other metal or physical learning activity as may be desired by any user. The video generation device 102 may further include a multimedia processor 104 which may process on-demand instructions via a multimedia processing model. The multimedia processor 104 may enable the video generation device 102 to generate on-demand videos of the targeted interactive activities and renders the video for one or more users providing flexibility to the user to choose one or more videos based on user specific preferences. The functioning of the multimedia processing model is further explained in detail below, in conjunction with further embodiments. To generate at least one on-demand video of at least one targeted interactive activity, the video generation device 102 may be configured to create a plurality of videos.

The plurality of videos may correspond to one or more targeted interactive activities as may be performed by trainer. The trainer as described in accordance with the present disclosure, may be a training expert, a professional trainer, Artificial Intelligence based trainer, a cartoon, an Avatar, or any trainer who may provide training or giving instructions in the video for an ease of the users. The trainer instructions may be provided as verbal instructions, voice notes, gestures, or goal specific instructions, or the like. Once the plurality of videos is created, the video generation device 102 may also be configured to store the plurality of videos in a storage database 116.

In an embodiment, the plurality of videos may include but not limited to a pre-created video, an animated video, Artificial Intelligence (AI) model based videos, or any purposefully created video, auto generated videos via AI, and the like. The storage database may be at least one of an online storage (for example, a server, or a database) or a device storage (for example, a memory 106). Upon storing the plurality of videos in the storage device 116, the video generation device 102 may enable the processor 104 to create a plurality of video snippets from each of the plurality of videos, such that, each of the plurality of snippets may include a video clip or a short video of the one or more targeted interactive activities. "Snippet" as used herein, implies a small video (in accordance with the present disclosure) carrying a piece of information contained herein, which is displayed on the screen with visuals appearing as result of an input, a query, or a request as may be provided by any user. The snippet, as the name suggests, allows a user to understand a particular search query better with a related video. The memory 106 may be a non-volatile memory (e.g., flash memory, Read Only Memory (ROM), Programmable ROM (PROM), Erasable PROM (EPROM), Electrically EPROM (EEPROM) memory, etc.) or a volatile memory (e.g., Dynamic Random-Access Memory (DRAM), Static Random-Access memory (SRAM), etc.).

The video generation device 102 may further include various devices such as a display 108 provided with a graphical user interface (GUI) 110. The user may interact with the video generation device 102 and vice versa via GUI 110. By way of an example, the display 108 may be configured to exhibit results on the screen accessible to the user (such as playing the on-demand video of any targeted interactive activity). In an equivalent manner, GUI 110 may be used to provide one or more inputs to alter or personalize the display of on-demand video.

In an embodiment, memory 106 which can store instructions and which, when executed by the processor 104, may cause the processor 104 to perform various functions including but not limited to snippet creation using a snippet creation model 104a. The snippet creation model 104a may create plurality of snippets from the available and pre-stored videos relating to varied activities. Further, the created snippets may be matched or compared with other similar video snippets based on matching of one or more similar attributes associated with each of the video snippets or matching activities performed in the video snippets. The multimedia processor may include a computing model 104b for the purpose of matching, comparing, computing, or deciding what all snippets are to be combined from the plurality of snippets created from the plurality of videos.

Once the plurality of video snippets is selected, they may be combined to form an on-demand video of plurality of video snippets. The combining of plurality of video snippets may be performed using a combining model 104c of the multimedia processor 104. As a result, a combined video is obtained as on-demand video through the multimedia processor. The generated on-demand video may be stored in database 116 or may be locally stored in memory 106. It should be noted that all such models (104a, 104b, and 104c), may be represented as a single model or a combination of models of the multimedia processor 104 operating as multimedia processing model.

Further, as will be appreciated by those skilled in the art, each of these models may reside, in whole or in parts, on a device or multiple devices in communication with each other. In some embodiments, each of the model (104a, 104b, and 104c) may be implemented as dedicated hardware circuit including custom application-specific integrated circuit (ASIC) or gate arrays, off-the-shelf semiconductors such as logic chips, transistors, or other discrete components. Each of the models may also be implemented in a programmable hardware device such as a field programmable gate array (FPGA), programmable array logic, programmable logic device, and so forth.

Alternatively, each of the models may be implemented in software for execution by several types of processors (e.g., multimedia processor 104). An identified model of executable code may, for instance, include one or more physical or logical blocks of computer instructions, which may, for instance, be organized as an object, procedure, function, or other construct. Nevertheless, the executables of an identified models or components need not be physically located together but may include disparate instructions stored in various locations which, when joined logically together, include the model, and achieve the stated purpose of the model. Indeed, a model including executable code could be a single instruction, or many instructions, and may even be distributed over several different code segments, among different applications, and across several memory devices. As will be appreciated by one skilled in the art, a variety of processes may be employed for generating on-demand video of interactive activities.

For example, system 100 and the associated video generation device 102 may generate the on-demand video of targeted interactive activities by combining process discussed herein. As will be appreciated by those of ordinary skill in the art, control logic and/or automated routines for performing the techniques and steps described herein may be implemented by the system 100 and the associated video generation device 102 either by hardware, software, or combinations of hardware and software. For example, suitable code may be accessed and executed by the one or more processors on the system 100 to perform some or all the techniques described herein. Similarly, application specific integrated circuits (ASICs) configured to perform some, or all the processes described herein may be included in the one or more processors on the system 100.

In an embodiment, the video generation device 102 may also interact with external devices 112 over a communication network 114 for sending, receiving, or exchanging any data or information. The external devices 112 may be configured to access the generated on-demand video. Examples of external devices 112 may include, but are not limited to computers, tablets, smartphones, laptops, or the like. The communication network 114, for example, may be any wired or wireless communication network, including, but may be not limited to, Internet network, Wireless Local Area Network (WLAN), Wi-Fi, Long Term Evolution (LTE), Worldwide Interoperability for Microwave Access (WiMAX), or General Packet Radio Service (GPRS).

Figure 2:
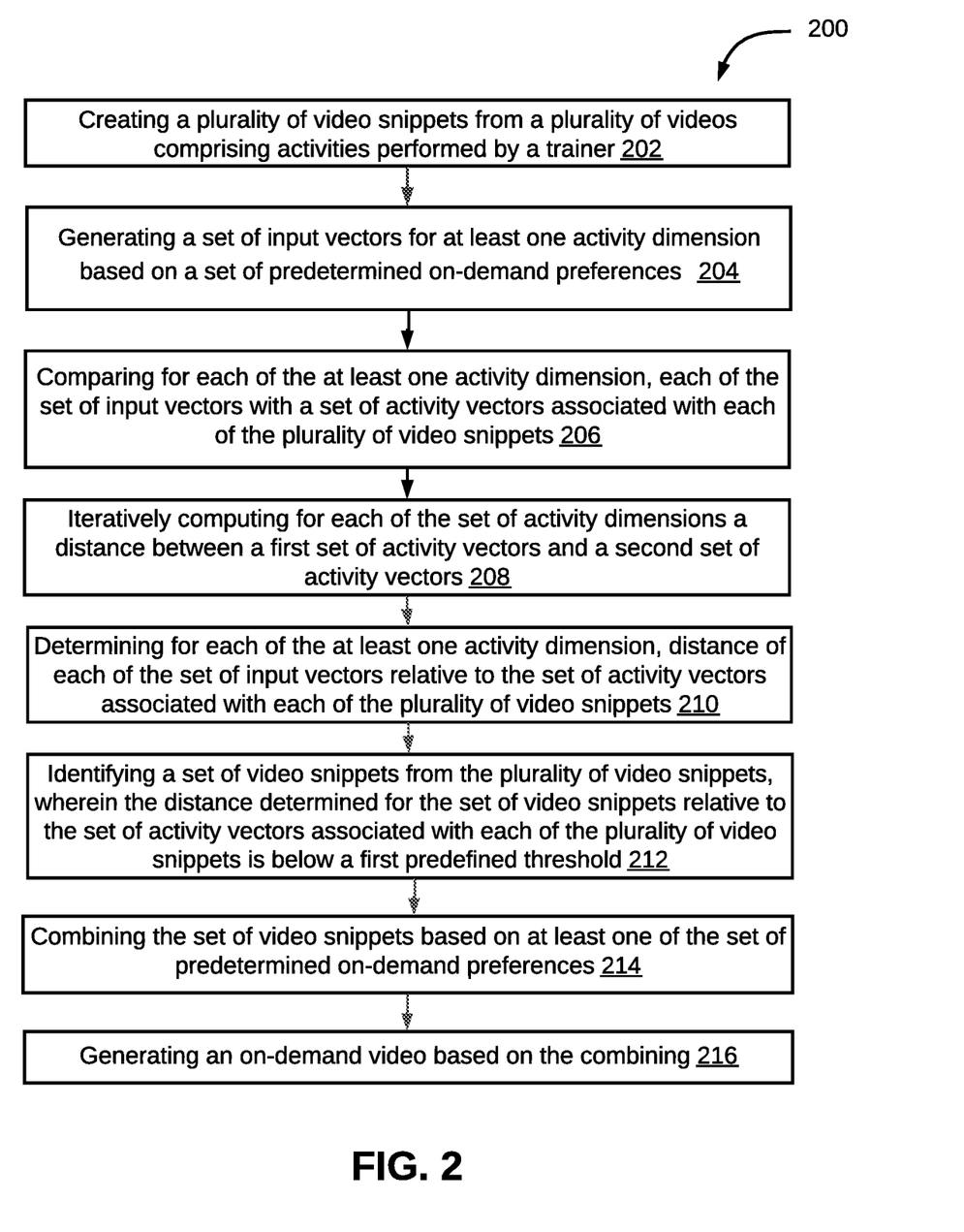
FIG. 2 illustrates a flowchart of a method of generating on-demand videos, in accordance with some embodiments.

Referring now to FIG. 2, a flowchart of a method of generating an on-demand video of targeted interactive activities is illustrated, in accordance with some embodiments of the present disclosure. The method may include creating at step 202, by a multimedia processing model, a plurality of video snippets from a plurality of videos including activities performed by a trainer in the video. In an embodiment, the plurality of videos may correspond to one or more different targeted interactive activities which may be performed by one or more trainer. The targeted interactive activities have been discussed in the paragraphs of the present disclosure.

At step 204, the method performs generating, by the multimedia processing model, a set of input vectors for at least one activity dimension based on a set of predetermined on-demand preferences. The activity dimension as disclosed herein may include, but not limited to, a single activity dimension, or numerous activity dimensions. The activity dimension may include specific categories associated with the targeted interactive activities which may serve as a video selection or shortlisting criteria for the users. The user may select or reject any video from the given list of videos based on the suitable category or activity dimension of the videos. It may also happen that, at one time instance, the user may shortlist one or more activity videos by choosing one or more activity dimensions for a given video.

Various examples of activity dimensions or categories or user chosen criteria, include, but not limited to type of trainers performing in the video such as expert trainers, nascent trainers, personal trainer, coaches, specialists, fast pace trainer, or the like, kind of music being played in the video, or the text displayed in the video, or background effects used in the video, actions or movements performed by the trainer in the video, environment or surroundings, or any other audio-visual content provided in the video which may or may not please the user, or a combination of such activity dimensions thereof.

In an embodiment, various activity dimensions associated with each of the plurality of videos, may further include a plurality of activity vectors or different sets of different activity vectors, or specific attributes associated with each of the activity or specific video categories or the like. The activity vectors may be understood as sub divisional attributes associated with each of the category associated with the videos, based on which user may take a decision about the selection of the video. As mentioned, each of the activity dimension may include a plurality of activity vectors, for example, for the 'type of trainers' dimension, the associated trainer attributes or trainer vector which would be important may include, but not limited to, background effect of the trainer where the trainer has recorded the video, voice quality of the trainer, tone or language of the trainer, regional or preferred language spoken by the trainer in the video, friendly or easy instructions provided by the trainer, clarity of actions or movements performed by the trainer, dressing style of the trainer, experience of the trainer in the relevant field, knowledge of the trainer, skills of the trainer, hair color of the trainer, skin color or skin tone of the trainer, pace or speed of the trainer, or height or size of the trainer, or the like.

Another category of activity dimension may be related to 'video quality' having specific activity attributes associated with it, including for example, picture quality of the video, orientation, display, number of pixels, resolution of the video, clarity of the picture, or the like. Other activity dimension may be "type of actions" being performed by the trainer in the video which may include vectors such as ease of performing actions or movements, action speed, frequency of repetition or pace of one action, clarity of movements, relevant instructions provided along with actions to help user to perform tricky actions easily, technicality of actions, flexibility to change any action, frequency of occurrence of the action, mode of action, intensity of the action, or the like.

In an embodiment, the 'background effects' category of the video may include activity vectors such as background colour, surrounding environment and vibes in the environment, ambient lighting, shadowing, curtain, back-drop, or wall picture used in the background, shades in the background, or the like. Other activity dimension may be related to 'audio quality' of the video including but not limited to one or more audio vectors including tone in the audio, volume, pitch, speed, tempo, or the like. In another embodiment, once the user has chosen the set of activity vectors related to any of the activity dimension of the video, the multimedia processing model may perform comparing for each of the at least one activity dimension each of the set of input vectors with a set of activity vectors associated with each of the plurality of video snippets at step 206.

Further, at step 208, the multimedia processing model may perform iteratively computing for each of the set of activity dimensions a distance between a first set of activity vectors and a second set of activity vectors and determining for each of the at least one activity dimension, at step 210, each of the set of input vectors relative to the set of activity vectors associated with each of the plurality of video snippets.

It may be noted that the distance as described herein, in accordance with the present disclosure, may be the distance between two or more activity vectors or it may be the distance between one or more input vectors and the activity vectors associated with the input vectors. The distance may be determined to calculate the gap between the events of occurrence of two or more such activity vectors associated with each of the activity dimension in the video.

In an embodiment, the method may further perform at step 212, identifying, by the multimedia processing model, a set of video snippets from the plurality of video snippets. The distance determined for the set of video snippets relative to the set of activity vectors associated with each of the plurality of video snippets is below a first predefined threshold.

It may be noted that the first predefined threshold may be a reference value of the threshold which may be stored in the multimedia processing device to enable the processor to compare the set value with the calculated value to determine the distance between the two values. The method at step 214, performs combining by the multimedia processing model, the set of video snippets based on at least one of the set of predetermined on-demand preferences. As a result of the above steps, the method may generate at step 216, using the multimedia processing model, an on-demand video in response to the combining.

It may be noted that the predetermined on-demand preferences, as disclosed herein, in accordance with the present disclosure, may be received by the user. The predetermined preferences may be based on user preferences of performing the one or more targeted interactive activities in an order designed or defined by the user, or it may be the user's selection of one or more similar targeted interactive activities from the given set of activities, or the user preference may be based on relevancy of similar snippets taken from different videos, or the like. Also, the predetermined user preferences may include the number of repetitions of an activity in the video, duration of the activity, speed, or difficulty in performing the activity, relevance of theme, color in the background, or the like. Further, in an embodiment, the set of predetermined on-demand preferences may be created based on a set of standard predefined user preferences which may be pre-stored in the system.

In some embodiments, for combining the set of video snippets, certain ranks may be assigned to each of the set of video snippets based on a proximity of the determined distance (e.g., distance which may be computed based on the difference between the activity vectors or input vectors) from the first predefined threshold (as explained above). The distance may be determined in a way that the video snippets having the highest proximity may have maximum similarity. As a result, such video snippets may fall first in the order when combined to generate the on-demand video. Hence, video snippets with high proximity (e.g., video snippets with more closeness and similarity) would be given more preference or would be viewed a greater number of times by the users in the on-demand videos. The video snippets with more similarity may be given a higher rank or order or it may be considered as the opening video snippet in the on-demand video.

Alternatively, the video snippets having the least proximity, (e.g., zero or least closeness) may have minimum similarity amongst them. Such video snippets would be given the lowest rank in the on-demand video. Based on the assigned ranking of the video snippets in the on-demand video, the place for an opening video snippet may be determined. As a result, the highest ranked video snippet may be considered as the opening video snippet in the on-demand video while the lowest ranked video snippet would still be considered for the on-demand video but would not be the opening video.

The opening video snippet may be the starting video snippet which may be played as the first video snippet when a video is first started. The opening video snippet or the subsequent video snippets may be arranged in a preferred order. The ranking of the videos may be assigned by the multimedia processing device.

In an exemplary embodiment, the method for combining the set of video snippets may include assigning a rank to each of the set of video snippets based on proximity of the determined distance from the first predefined threshold. The first predefined threshold is considered as the benchmark or reference value or reference point, with respect to which the computed distance may be compared to determine the proximity of video snippets. For example, the video snippet having the least proximity may be provided the highest rank and the video snippet having the highest proximity may be given the lowest rank in the on-demand video. The lowest ranked video means less desirable video by the user but still be important to be rendered to the user based on the activity circuit or preferences defined by the users. Further, based on the determined ranking the set of video snippets may be combined. The order of combined videos may be defined to place the highest ranked video snippet as the opening video snippet in the on-demand video whereas the lowest ranked video snippet may be placed farther from opening video snippet in the on-demand video. The lowest rank video snippet may still be an important video snippet for the user based on user preferences but to be viewed at later point in time in the video.

In an exemplary embodiment, the method for generating the on-demand video further includes the steps of combining the set of video snippets. The method may be implemented by the multimedia processing model (using multimedia processor 104) to determine a set of start edge vectors and a set of end edge vectors for each of the set of video snippets as may be selected based on predetermined user preferences (as explained above). The start edge vectors may be the starting point or a starting note of a particular video snippet whereas, the end edge vectors may be the closing or ending points of another video snippet created from the pre-stored videos. Every video snippets as may be selected and connected for creating the on-demand video, may have a start edge vector (e.g., a starting point) and an end edge vector (e.g., the ending point).

The model may select at least one video snippet to be considered as a first video snippet selected from the set of available video snippets. Further, the model may select a second video snippet from the remaining set of video snippets. The model may further compare the set of end edge vectors of the first video snippet with the set of start edge vectors of each of the remaining set of video snippets or of the second video snippet. The distance between the starting point of the first video and ending point of the second video or any of the succeeding videos is calculated. The videos may be arranged in any of the predetermined order.

In an exemplary embodiment, the computed distance between the set of end edge vectors of the first video snippet and the set of start edge vectors of the second video snippet may be below a second predefined threshold. Like the first predefined threshold, the value for the second predefined threshold may also be stored in the database to be referred to at a later point in time during video display. Based on the calculated distance or lapse or time gap, the first video snippet with the second video snippet may be combined to generate on-demand video. It may be noted that the first video snippet may be selected based on the set of predetermined on-demand preferences. As described herein, the first video snippet is the opening video snippet in the on-demand video.

In an embodiment, for combining the set of video snippets, the multimedia processing device may further be configured to determine an order of combining the set of video snippets based on a predefined criteria which may be defined by the user. Likewise, for combining set of video snippets the multimedia processing device may require a connective video snippet. The connective snippet may include, but not limited to a stitching snippet, filler snippet, a talking head, or an illustrating snippet, or the like, which may be placed in between one or more of the video snippets as may be required to be connected in an order to generate an on-demand video. The one or more connective video snippets may include, for example, an announcer which may be configured to provide voice-based or verbal instructions for performing one or more targeted interactive activities associated with the one or more video snippets which may be connected.

The connective snippets may additionally be fetched by the multimedia processing device from a set of connective video snippets pre-stored in the database or in the memory of the system. The connective video snippets may be selected for connecting each of the set of consecutive video snippets in a user defined order. The connective video snippets may be placed in an order such as in interleaving manner, or may be overlaid, or in picture-in-picture combination, or the like. The connective video snippet may be placed between the associated set of consecutive video snippets. By the term consecutive video snippets, it means that the plurality of video snippets may be arranged in a continuous manner such as one after the other.

In an embodiment, the method for selecting at least one of the connective video snippet for a set of consecutive video snippets, may further include determining a first distance (the computed distance) of a set of end edge vectors (e.g., a plurality of ending or closing points of a video snippet associated with specific activity vectors of that video snippet) of a preceding video snippet (such as the video snippet which was played just before the current video snippet) from the set of consecutive video snippet with a set of start edge vectors (contrary to end edge vectors, the start edge vectors may include a plurality of starting or opening points of a video snippet associated with similar specific activity vectors) of each of the set of connecting video snippets. The method may also include the steps of determining a second distance of a set of start edge vectors of a succeeding video snippet (e.g., video snippet to be placed and played after the current video snippet) from the set of consecutive video snippet with a set of end edge vectors of each of the set of connecting video snippets.

As a result, selecting at least one of the connective videos in response to the comparing of the set of end edge vectors of the preceding video snippet and comparing the set of start edge vectors of the succeeding video snippet, such that an average of the first distance and the second distance is the lowest relative to an average distance computed for the remaining set of connective video snippets. The computed distance may be determined for the set of video snippets relative to the set of activity vectors as at least one of the Euclidean distances. Euclidean distance as described herein may indicate the distance computed between the two vectors falling under the known Euclidean space, such as the length or gap between the start and end points of the activity vectors associated with each of the video snippets. Alternative to Euclidean distance, any other analogous relationship may be used such as Manhattan Distance, Minkowski Distance, Cosine, Hamming, Chebyshev, Jaccard, Haversine, Sorensen-Dice, or the like.

In an embodiment, a trained Artificial Intelligence (AI) model may be used for generating the set of consecutive video snippets. The AI model may automatically determine a set of vectors (e.g., activity vectors) for every set of video snippets. The AI model may calculate an average set of vectors based on the set of vectors determined for each of the set of video snippets. The AI model may further automatically create the set of consecutive video snippets based on the average set of vectors as computed by AI model.

In some embodiments, the on-demand video as generated through the video generation device 102 may be rendered via the display device 108 to the users. The performance of the generated on-demand video may be required to be monitored from time to time to ensure proper rendering and playing of the videos for the users. Alternatively, the on-demand video may be required to be automatically monitored in real time. For automatic monitoring of the on-demand video, the video generation device may be configured with Artificial Intelligence (AI) model, which may monitor activities performed by the users in response to viewing the rendered on-demand video on the display device.

The AI model may further enable synchronizing the rendered on-demand videos with respect to user performing the targeted activity by viewing the on-demand video. The synchronization of the on-demand video may include, but not limited to controlling, repeating activities, stopping the activities, contemporizing, optimizing, switching between the videos, or establishing a coordination between one or more of the user pace, speed, actions, steps, repetitions, errors, or the like, of the on-demand video. The synchronization may preferably be performed to match the pace, speed, actions, steps, repetitions, or errors, etc., of the on-demand video with that of the user performing the activity.

By the way of an example, synchronization may include, but not limited to, switching between the videos having similar activity vectors associated with the similar activity dimensions or switching between the videos selected from the set of different activity videos having different activity vectors associated with the videos. For example, when the user is accessing the video and the user slowdown, leading to user pace mismatch with the pace of the video. Also, the slowing down of the video may lead to several playback changes in the video including, but not limited to changes related to pitch, voice, tone, language, actions performed in the video, or the like. For example, in the video the instructions provided by the trainer performing the intended activity may be rendered as e.g., "SLOW DOWN A BIT" or "2 MORE REPS", or "5 MORE PUSHUPS", etc.

The user may receive such instructions in the video because of user errors while performing the activity. Therefore, in such scenarios the videos may be synchronized to match the pace, tone, voice, or speed etc., by selecting any similar alternative video from the myriad of video clips in the video library or network of various video clips.

In an embodiment, the displayed video may be switched with another video, which may be selected from the library of stored videos, or the videos may be switched using the AI model. The AI model may auto select or switch to any alternative video if an error is identified while the user is performing the activity. The synchronization may be performed in response to the monitoring of the videos. The AI model may eventually generate in response to monitoring and synchronizing, a dynamic feedback to the user in response to the user performances.

As will be appreciated, the above-described steps (i.e., monitoring the activities performed by the user, synchronizing the on-demand videos with the user performance, or controlling the pace (for example, play, pause, or switch) of the on-demand video based on the response of the user activity, and providing dynamic feedback to the user) may be performed by using an Artificial Intelligence (AI) model, or a statistical model, or an algorithm, and the like.

In an exemplary embodiment, the dynamic feedback may include, but may not limited to one or more of the amount of calories burnt, count of an activity performed, time spent on the activity during a previous activity session of the user, incorrect posture or pace of the user while performing the activity, correct posture or pace to perform the activity, absolute activity performance and proficiency of the user, relative activity performance proficiency of the user, best time taken to perform the activity, frequency of user errors, or corrective actions taken by the user in response to the error or the like.

By the way of an example, if the user makes some error while performing the activity, the feedback may be auto generated via AI model for the user specifying user errors such as "DO NOT BEND YOUR KNEES", or "SQUATS NOT PROPERLY DONE", "LEG RAISED TOO HIGH", "BEND A LITTLE", "GO SLOW", etc. To correct such an error, the user must perform corrective actions by properly following the video and matching the pace of the video or the user may select any alternative videos from the library of videos.

In one embodiment, to overcome the synchronizing errors, the on-demand videos may be provided with significant resources for the ease of the user, so that even the smallest variation as may be required, do not lead to re-recording or editing of the videos. The re-recording or editing of any live video is a cumbersome activity. In scenarios where the workout sessions are extended in terms of number of repetitions, or in case where similar activities are being repeated in several different circuits, then the on-demand videos may be re-configured to meet the user requirements, or to change the order of the activities as per user preferences.

Figure 3:
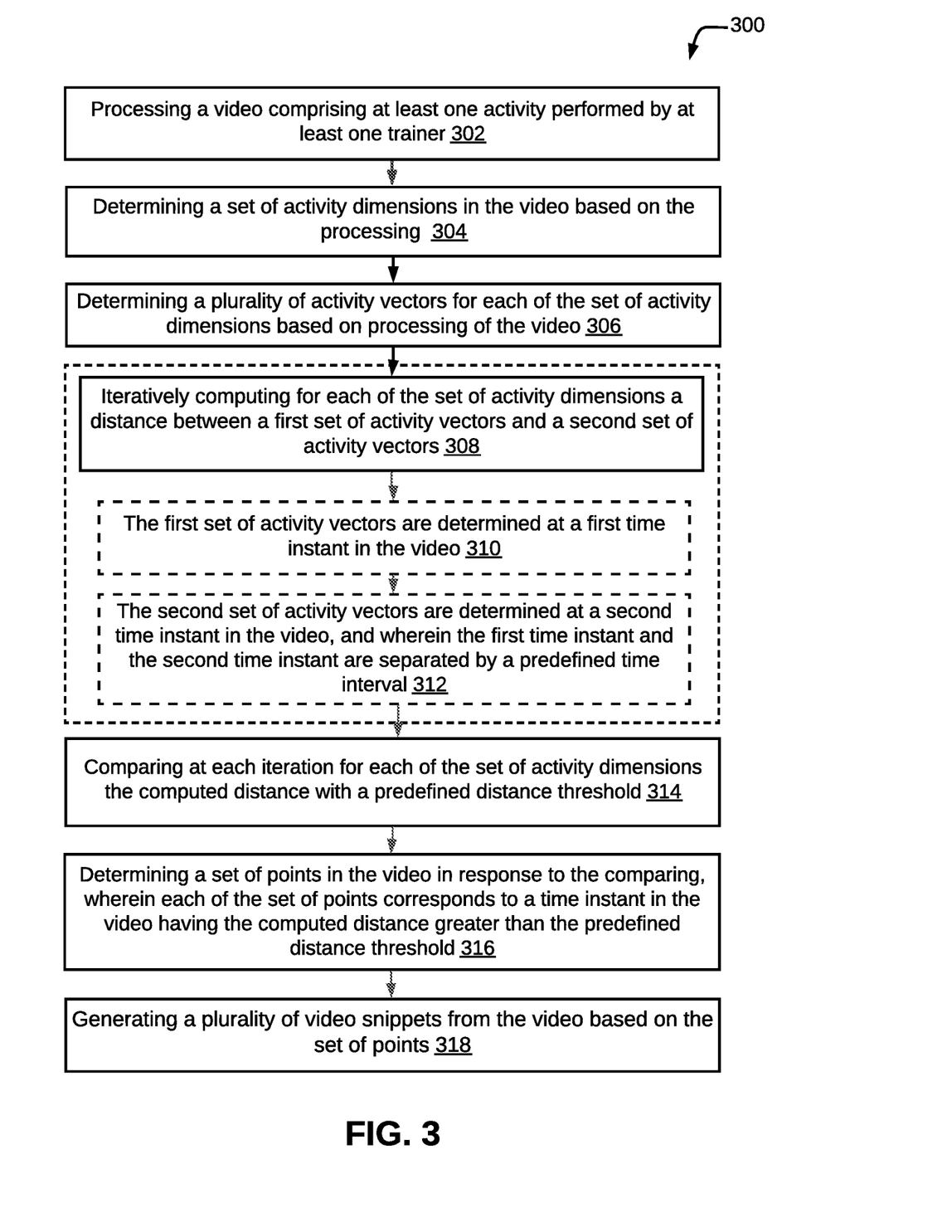
FIG. 3 illustrates a flowchart of a method of creating video snippets of interactive activities, in accordance with some embodiments.

Referring now to FIG. 3, a flowchart of a method of generating video snippets is illustrated, in accordance with some embodiments of the present disclosure. The method may include, at step 302, processing via a multimedia processing model a video including at least one activity performed by at least one trainer. The processing of the video may be performed using multimedia processor 104 (as explained in above embodiments). At step 304, the multimedia processing model may determine a set of activity dimensions in the video, based on the processing of the video. The multimedia processing model at step 306, may further determine a plurality of activity vectors for each of the set of activity dimensions, based on processing of the video. It is to be noted that activity dimensions and activity vectors are to be interpreted in a similar context as disclosed above in accordance with the present disclosure.

In an embodiment, the multimedia processing model executed by the multimedia processor, may implement at step 308, an iteratively computing process for determining the distance between a first set of activity vectors and a second set of activity vectors selected for each of the set of activity dimensions associated with each of the activity videos. The first set of activity vectors are determined at the first time instant in the video at step 310 whereas the second set of activity vectors are determined at a second time instant in the video, at step 312. The first time instant and the second time instant are separated by a predefined time interval(s) in the video. The first-time instant may be the point of first-time occurrence of first set of activity vector associated with a video. Similarly, the second time instant may be the point succeeding the first time instant in the video which may be related to another set of activity vectors which may be different from the first set of activity vectors for first-time instant.

Once the first time instant and the second time instant are determined and the distance is computed through the iterative process, the multimedia processing model, at step 314, may then compare at each iteration for each of the set of activity dimensions, the computed distance with a predefined distance threshold. The predefined distance threshold may be the reference value or the standard calculated distance which may be in case of for similar computation. The predefined threshold may be stored in the database. Further, at step 316, the multimedia processing model, may determine a set of points in the video in response to the comparing, such that each of the set of points correspond to a time instant in the video having the computed distance greater than the predefined distance threshold.

As a result of the computed distance and comparing, the multimedia processing model, at step 318 may generate a plurality of video snippets from the plurality of available videos based on the set of points. In an embodiment, the set of points in the video may represent transition across at least one of the set of activity dimensions.

In an exemplary embodiment, the multimedia processor may be configured to process another trained AI model, or algorithm for generating video snippets. The method for creating the video snippets may further include generating at least one tag for each of the plurality of video snippets. The tagging of the video snippets may be performed based on the associated set of activity vectors for each of the set of activity dimensions for each of the video snippets. Post tagging, each of the plurality of video snippets may be augmented with the generated tags. The tagging of the video snippets may include, but not limited to, information corresponding to specific type of activity, duration of the carrying out the activity, intensity of performing the activity, language used while performing the activity in the video, name or location of the trainer, experience of the trainer, gender of the trainer, date of video creation, or video quality, image pixels, camera ID, web page description, or a combination thereof. Tagging of each of the plurality of video snippets may involve providing unique code or assigning identifiers to each of the video snippet. In a way, tagging is done to assign a unique callout name to each of the video snippet.

In an exemplary embodiment, the plurality of video snippets may alternatively be generated via AI model. The automatic generation of video snippets may be based on predetermined user preferences or may be based on the AI based preferences. For example, AI may decide based on historical user performances which video snippet would more likely be appropriate for the user. The AI model may auto generate video snippets from any set of selected videos as may be available in the database or the video library. The AI model may also combine multiple auto generated video snippets to generate an on-demand video for the user based on the user inputs.

In an exemplary embodiment, the multimedia processor 104 may be configured to train the AI model, described in conjunction with the method disclosed in FIG. 3. The AI model may first be provided with a set of training video snippets. Each of the set of training video snippets may be annotated or marked with the pre-assigned tags. The trained AI model may assign preliminary tags to each of the set of training video snippets, based on the activity specific ontology dictionaries. The activity specific ontology may be the pre-stored dictionaries where activity specific information, knowledge and formal description may be found.

The ontology dictionaries may include some specific sub-class level data and metadata information for each type of activities such as any targeted interactive activities (as explained earlier in the disclosure), which may be performed by the user in any predetermined preference or order. The term "ontology", as may be described herein, refers to a formal description of knowledge available in the form of set of concepts associated with a specific activity domain (such as specific activity vectors) and the relationships that hold between them. Ontology ensures a collective understanding of information and provides explicit domain assumptions thus allowing organizations to make better sense of their data.

In an embodiment, the ontology dictionaries may provide background information, or any other relative information related to any activity domain. In an embodiment, the AI model may compare, for each of the set of training video snippets, the assigned preliminary tags with the pre-assigned tags and determine the differential between the preliminary tags with the pre-assigned tags. The difference between the tags may be computed for each of the set of training video snippets. The AI model may determine the incremental learning based on the determined differential. The pre-assigned tags may be the stored tags, or inbuilt tags, available in the database.

Figure 4:
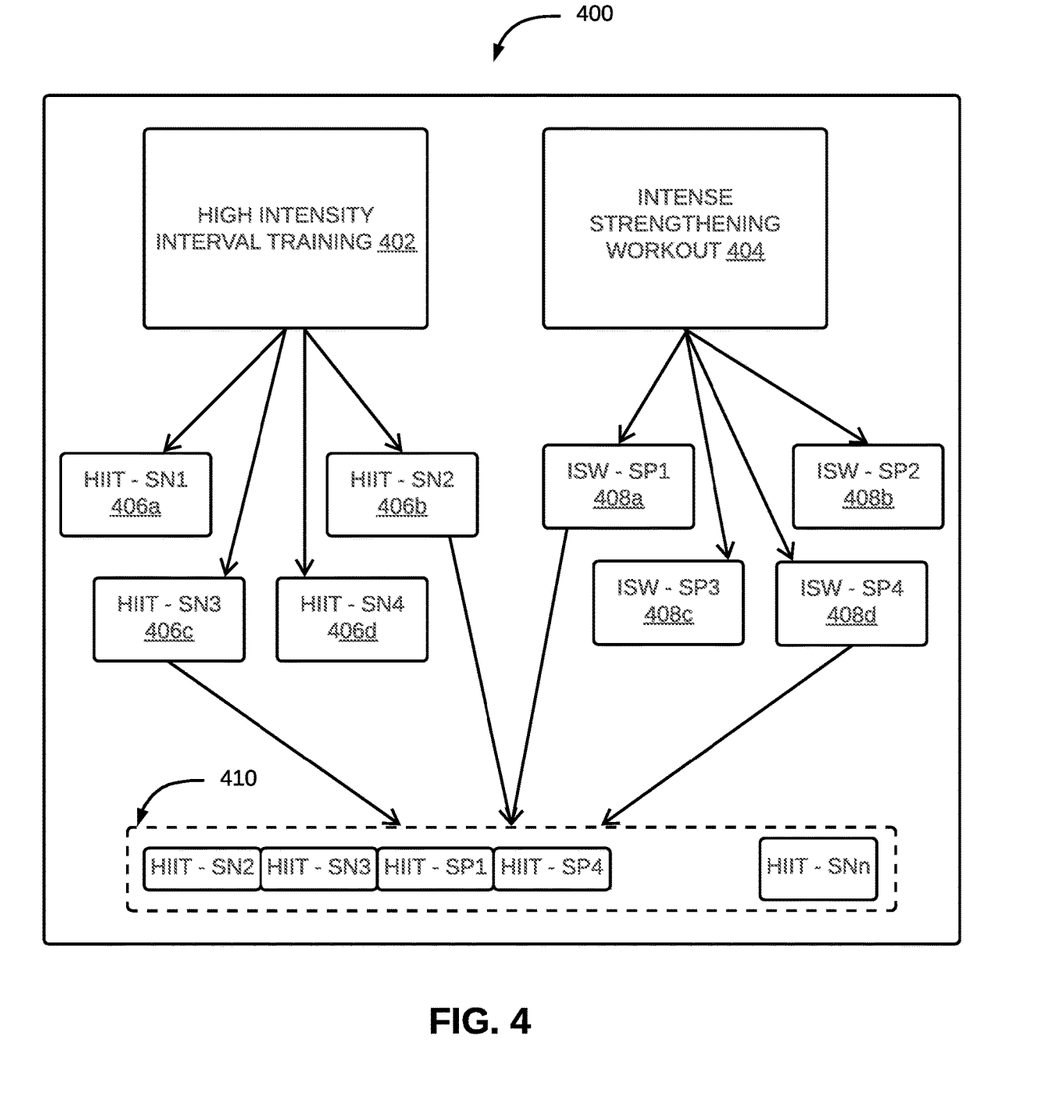
FIG. 4 illustrates a functional block diagram of a system for generating video snippets, in accordance with some exemplary embodiments.

Referring now to FIG. 4, a functional block diagram for generating video snippets is illustrated, in accordance with some exemplary embodiments. The system 400 for generating on-demand video 410 is illustrated. The system may include a plurality of display devices 402 and 404, for displaying the videos of targeted interactive activities which may be accessed through the screen (not shown) of the display device to the users. As shown therein, one or more videos of targeted interactive activities may be displayed in a manner depicted in FIG. 4. The video displayed on device 402 may for example be a high intensity interval training (HIIT) video. Likewise, the second video displayed on the other device 404 may for example be a strengthening workout video. The videos may be selected from the list of available videos or the multiple videos which may be stored in the database. The videos may be associated with the specific targeted interactive activities (as described above herein) which may be desired to be performed by any user selected based on the user defined preferences.

The video generation system 400 via the multimedia processing model creates multiple snippets from each of the available videos. The multiple snippets can be created from a single video such as the HIIT video 402, depicted as HIIT-SN1, HIIT-SN2, HIIT-SN3, and HIIT-SN4 for exemplary purposes. The multiple snippets are created in the form of multiple small cut videos 406a, 406b, 406c and 406d. Based on the user preferences more such snippets may be customized or tailored as per the user demands. The snippets may be broken down from the single video into multiple fragments of videos which may be easily accessible and readily played in less time than the time consumed to play and watch the full video. Like HIIT snippets, the second set of video snippets may be created from the second set of video 404.

The second set of videos are depicted as ISW-SP1, ISW-SP2, ISW-SP3, and ISW-SP4 for exemplary purposes. The second set of snippets 408a, 408b, 408c, and 408d, may be associated with specific activity vectors relative to intense strength workout dimensions. Similarly, the HIIT video snippets may be associated with HIIT dimensions having HIIT specific activity vectors. Each of these video snippets for HIIT or ISW dimensions may or may not have similar matching activity vectors.

Based on the respective activity vectors associated with each of the activity dimensions, the set of activity vectors may be compared to select which activity vector would be suitable to best meet the user requirements. Once the relevant set of video snippets are identified and shortlisted based on the predetermined user preferences, the video snippets from retrieved from the separate set of videos may be combined to generate an on-demand customized video for the user as shown in 410. The video snippets are more likely to be created from different sets of videos, but based on the predetermined preferences, the video snippets may be created to skip and combine some of video snippets from the same video. Thus, the user may desire to skip or cut some unwanted videos falling between the full video.

The generated on-demand video 410 may be rendered to the user via display device. It may be noted that as many number of video snippets may be created from any given video. The number of video snippets may vary from 1, 2, 3 . . . and so on till the 'nth' video snippet. The 'nth' video snippet would be the last or ending video snippet and the very '1$^{st}$' video snippet may be the starting video snippet or opening video snippet of any video. Further, the video snippets may be combined in any order as may be defined by the user based on their preference.

The video snippets may be related to different HIIT or ISW activities for example HIIT-SN1 may relate to "PUSH-UPS", HIIT-SN2 may represent "LUNGES", HIIT-SN3 may correspond to "BENCH PRESS", and the like. Similarly, ISW-SP1 may indicate "BURPEE", ISW-SP2 may represent "DUMBBELL PRESS", ISW-SP3 may represent "PLANKS", or the like.

In an exemplary embodiment, the on-demand video 410 as may be presented to the one or more users for performing an activity in an activity circuit which may be defined by the user. The activity circuit may include one or more targeted activities of different activity dimensions or category.

For example, the 'ABS' category may include the following sub-activities: core scissors and elbow knee; the 'ARMS' category may include the following sub-activities: a band lateral raise, a band lateral stretch, a front hook, a front uppercut, boxing; the 'BACK' category may include the following activities: a front kettlebell, deadlift, a dead bug, and squat thrusters, the 'CHEST' category may include the following activities: burpees, pushups, and the 'GLU-TES' category may include the following activities: squat, burpees, and a dumbbell squat press.

In an embodiment, in the generated on-demand video, the video snippets may be arranged in any order or in any sequence as may be specified by the user or as processed by the multimedia processor.

Figure 5:
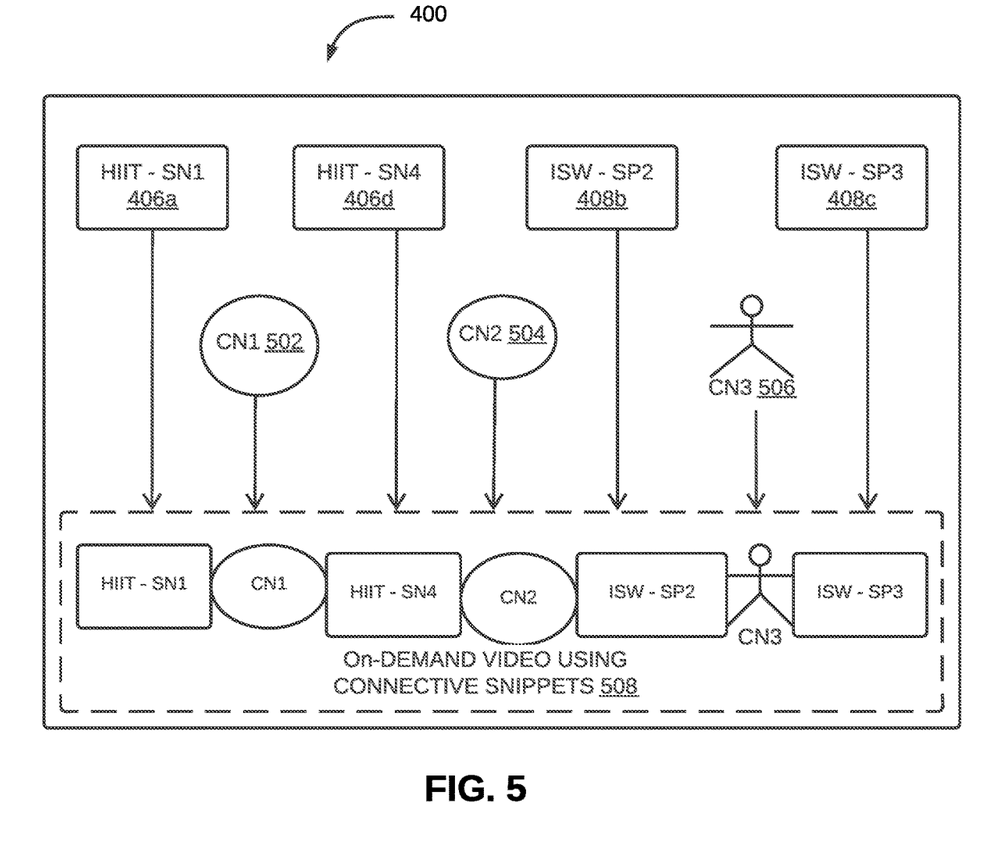
FIG. 5 illustrates a functional block diagram of a system for generating connective video snippets for combining multiple video snippets, in accordance with some exemplary embodiments.

Referring now to FIG. 5, a functional block diagram for creating on-demand video using connective snippets is illustrated, in accordance with some exemplary embodiments. The video generation system 400 may now enable the multimedia processing model to select at least one connective snippet based on the user preferences and connect the multiple video snippets using the connective snippets interleaving the video snippets. The connective snippets may be prestored or may be generated via AI model based on the predetermined preferences. The AI model may be the trained AI model or the algorithm which may be implemented by the processor to generate, select, and connect the video snippets using the connective snippets.

By the way of an example, one or more connective snippets as shown in FIG. 5, may be selected such as CN1 502, CN2 504, or CN3 506 and so on. The one or more connective snippets may be included as a filler snippet for combining one or more video snippets created from the plurality of videos. The one or more connective snippets may be used for combining one or more video snippets. The connective snippet is combined with the video snippets at a point where the first video snippet ends, and the second video snippet starts. The connective video snippet acts as a stitching snippet betwixt the two video snippets. Such connective video snippets may be used for making the on-demand video with connective snippets 508.

In an exemplary embodiment, connective snippets like a talking head, or an announcer may be provided, which may be added to the video snippets to generate the on-demand video. The on-demand video with connective snippet may provide verbal instructions to the users for performing targeted interactive activities as selected by the user. The talking head may introduce connecting instructions for example, "THROW YOUR SHOULDER BACK," "SHAKE THOSE HANDOUT," "ARM IN," "ARM OUT," etc., while performing the targeted interactive activities.

The connective snippet may further be provided in the form of a short connective video clip which may be required to smoothen or bridge the transition from one snippet to next snippet when connected. Alternatively, the connective snippet may also be provided in the form of an introductory video clip including transition instructions given by the talking head. Furthermore, the connective snippets may also be AI based or generated via AI model.

In an exemplary embodiment, an activity circuit may be created by any administrator, an instructor, an activity trainer, or the one or more user themselves. The activity circuit thus created may include, for example, one or more sets of three exercises. The exercises may optionally be selected as "5 PUSHUPS", "10 SQUATS" and "20 HIP FLEXIONS" to be performed by the user. To perform the selected exercises, the user may select one or more snippets from the library of pre-created or AI based snippets including the prestored video clips of selected exercises being performed by the trainer.

The selection of one or more snippets from the library of pre-created or AI snippets, may be made by matching the attributes or activity vectors associated with each of the exercises to be performed. Also, from the library of plurality of snippets, one or more connective snippets may be selected, for example a connective snippet conveying the parameter information as 5, 10, or 20 repetitions (reps) may be selected. Therefore, in this manner the user may select and create at least one activity circuit including multiple targeted activities of three or more repetition sets each for the number of selected exercises.

In an analogous manner, the on-demand videos may be generated by including the connective snippets or by combining different snippets from different videos as generated by two different trainers, in accordance with other embodiments as discussed and explained in the paragraphs above. In another exemplary embodiments, the overall On-demand introduction video may be generated including one or more verbal instructions which may include, but not limited to, "IN THIS CIRCUIT THE FOCUS WILL BE ON YOUR CORE MUSCLES." There are three exercises 'PUSHUPS,' 'SQUATS,' AND 'HIP FLEXIONS.' "WE WILL PERFORM THE SETS OF THE THREE EXERCISES ALTOGETHER." "LETS START REVIEWING EACH EXERCISE," "First THE PUSHUPS." The on-demand video will then cut through the snippets for pushups. Then the on-demand video will include the connective snippet as a voice-based instruction saying, for example, "WE WILL PERFORM 5". "NEXT, THE SQUATS." Here, the on-demand video will cut through the snippet for squats, followed by the connective snippet saying, for example, "WE WILL PERFORM 10". "Finally, THE HIP FLEXION." Similarly, the on-demand video will cut the snippet for hip flexion, and the connective snippet will play, saying, for example, "WE WILL PERFORM 20" of these. Then, the system says, "OK ARE YOU READY" and waits for user inputs. Next the system receives the input and responds as "LET'S START."

As will be also appreciated, the above-described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, whereby, when the computer program code may be loaded into and executed by a computer or controller, the computer becomes an apparatus for practicing the invention.

The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, whereby, when the computer program code may be loaded into and executed by a computer, the computer becomes an apparatus for practicing the invention. When implemented on a general-purpose microprocessor, the computer program code segments configure the microprocessor to create specific logic circuits.

Figure 6:
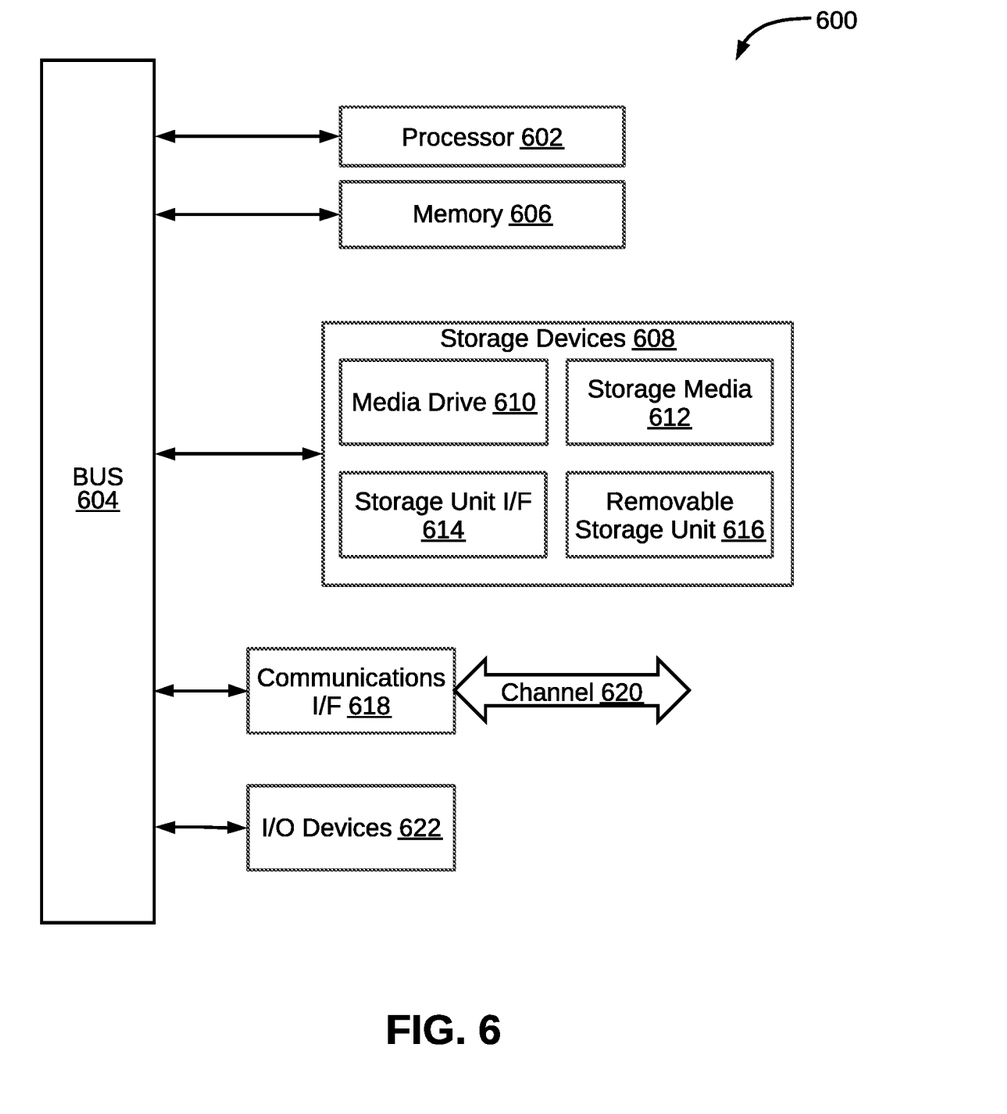
FIG. 6 illustrates a block diagram of an exemplary computer system for implementing embodiments consistent with some exemplary embodiments.

The disclosed methods and systems may be implemented on a conventional or a general-purpose computer system, such as a personal computer (PC) or server computer. Referring now to FIG. 6, an exemplary computing system 600 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 600 may represent, for example, a user device such as a desktop, a laptop, a mobile phone, personal entertainment device, DVR, and so on, or any other type of special or general-purpose computing device as may be desirable or appropriate for a given application or environment.

The computing system 600 may include one or more processors, such as a processor 602 that may be implemented using a general or special purpose processing engine such as, for example, a microprocessor, microcontroller, or other control logic. In this example, the processor 602 is connected to a bus 604 or other communication medium. In some embodiments, the processor 602 may be an Artificial Intelligence (AI) processor, which may be implemented as a Tensor Processing Unit (TPU), or a graphical processor unit, or a custom programmable solution Field-Programmable Gate Array (FPGA).

The computing system 600 may also include a memory 606 (main memory), for example, Random Access Memory (RAM) or other dynamic memory, for storing information and instructions to be executed by the processor 602. Memory 606 also may be used for storing temporary variables or other intermediate information during execution of instructions to be executed by the processor 602. The computing system 600 may likewise include a read only memory ("ROM") or other static storage device coupled to bus 604 for storing static information and instructions for the processor 602.

The computing system 600 may also include a storage device 608, which may include, for example, a media drive 610 and a removable storage interface. The media drive 610 may include a drive or other mechanism to support fixed or removable storage media, such as a hard disk drive, a floppy disk drive, a magnetic tape drive, an SD card port, a USB port, a micro-USB, an optical disk drive, a CD or DVD drive (R or RW), or other removable or fixed media drive. A storage media 612 may include, for example, a hard disk, magnetic tape, flash drive, or other fixed or removable medium that is read by and written to by the media drive 610. As these examples illustrate, storage media 612 may include a computer-readable storage medium having stored there in particular computer software or data.

In alternative embodiments, the storage devices 608 may include other similar instrumentalities for allowing computer programs or other instructions or data to be loaded into the computing system 600. Such instrumentalities may include, for example, a removable storage unit 616 and a storage unit interface 614, such as a program cartridge and cartridge interface, a removable memory (for example, a flash memory or other removable memory module) and memory slot, and other removable storage units and interfaces that allow software and data to be transferred from the removable storage unit 616 to the computing system 600.

The computing system 600 may also include a communications interface 618. The communications interface 618 may be used to allow software and data to be transferred between the computing system 600 and external devices. Examples of the communications interface 618 may include a network interface (such as an Ethernet or other NIC card), a communications port (such as for example, a USB port, a micro-USB port), Near field Communication (NFC), etc. Software and data transferred via the communications interface 618 are in the form of signals which may be electronic, electromagnetic, optical, or other signals capable of being received by the communications interface 618. These signals are provided to the communications interface 618 via channel 620. Channel 620 may carry signals and may be implemented using a wireless medium, wire or cable, fiber optics, or another communications medium. Some examples of channel 620 may include a phone line, a cellular phone link, an RF link, a Bluetooth link, a network interface, a local or wide area network, and other communications channels.

The computing system 600 may further include Input/Output (I/O) devices 622. Examples may include, but are not limited to a display, keypad, microphone, audio speakers, vibrating motor, LED lights, etc. The I/O devices 622 may receive input from a user and display an output of the computation performed by the processor 602. In this document, the terms "computer program product" and "computer-readable medium" may be used to refer to media such as, for example, memory 606, storage devices 608, the removable storage unit 614, or signal(s) on channel 620. These and other forms of computer-readable media may be involved in providing one or more sequences of one or more instructions to the processor 602 for execution. Such instructions, referred to as "computer program code" (which may be grouped in the form of computer programs or other groupings), when executed, enable the computing system 600 to perform features or functions of embodiments of the present invention.

In an embodiment where the elements are implemented using software, the software may be stored in a computer-readable medium and loaded into the computing system 600 using, for example, the removable storage unit 616, the media drive 610 or the communications interface 618. The control logic (in this example, software instructions or computer program code), when executed by the processor 602, causes the processor 602 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention may not be limited only by the claims. Additionally, although a feature may appear to be described in connection with embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for generating on-demand video, the method comprising:
    creating, by a multimedia processing model, a plurality of video snippets from a plurality of videos comprising activities performed by a trainer;
    generating, by the multimedia processing model, a set of input vectors for at least one activity dimension based on a set of predetermined on-demand preferences;
    comparing for each of the at least one activity dimension, by the multimedia processing model, each of the set of input vectors with a set of activity vectors associated with each of the plurality of video snippets;
    determining for each of the at least one activity dimension, by the multimedia processing model, distance of each of the set of input vectors relative to the set of activity vectors associated with each of the plurality of video snippets;
    identifying, by the multimedia processing model, a set of video snippets from the plurality of video snippets, wherein the distance determined for the set of video snippets relative to the set of activity vectors associated with each of the plurality of video snippets is below a first predefined threshold;
    combining, by the multimedia processing model, the set of video snippets based on at least one of the set of predetermined on-demand preferences, wherein combining the set of video snippets comprises:
        determining an order of combining the set of video snippets based on predefined criteria;
        selecting, for each set of consecutive video snippets in the determined order, a connective video snippet from a set of connective video snippets; wherein selecting the
connective video snippet from a set of consecutive
video snippet comprises:
determining a first distance of a set of end edge vectors of
a preceding video snippet from the set of consecutive
video snippet with a set of start edge vectors of each of
the set of connecting video snippets;
determining a second distance of a set of start edge
vectors of a succeeding video snippet from the set of
consecutive video snippet with a set of end edge
vectors of each of the set of connecting video snippets;
and
selecting the connective video in response to comparing
the set of end edge vectors of the preceding video
snippet and comparing the set of start edge vectors of
the succeeding video snippet, wherein an average of the
first distance and the second distance is the lowest
relative to an average distance computed for the
remaining set of connective video snippets;
interleaving the connective video snippet between the
associated set of consecutive video snippets; and
generating, by the multimedia processing model, an on-demand video based on the combining.

2. The method of claim 1, wherein combining the set of video snippets comprises:
determining, for each of the set of video snippets, a set of start edge vectors and a set of end edge vectors;
selecting a first video snippet from the set of video snippets;
comparing the set of end edge vectors of the first video snippet with the set of start edge vectors of each of the remaining set of video snippets;
selecting a second video snippet from the remaining set of video snippets, wherein the distance between the set of end edge vectors of the first video snippet and the set of start edge vectors of the second video snippet is below a second predefined threshold; and combining the first video snippet with the second video snippet.

3. The method of claim 2, wherein the first video snippet is selected based on the set of predetermined on-demand preferences, and wherein the first video snippet is an opening video snippet in the on-demand video.

4. The method of claim 1, wherein combining the set of video snippets comprises:
assigning a rank to each of the set of video snippets based on proximity of the determined distance, wherein a video snippet with high proximity is ranked highest and a video snippet with least proximity is ranked the lowest; and
combining the set of video snippets based on the rank assigned to each of the set of video snippets, wherein the highest ranked video snippet is the opening video snippet in the on-demand video.

5. The method of claim 1, wherein the set of predetermined on-demand preferences are received from a user.

6. The method of claim 1, wherein the set of predetermined on-demand preferences are created based on a set of standard predefined user preferences.

7. The method of claim 1, wherein the computed distance is determined for the set of video snippets relative to the set of activity vectors as at least one of a Euclidean distances.

8. The method of claim 1, further comprising generating, via a trained Artificial Intelligence (AI) model, the set of consecutive video snippets, wherein generating comprises:
determining a set of vectors for each of the set of video snippets;
computing an average set of vectors based on the set of vectors determined for each of the set of video snippets; and creating, via the trained AI model, the set of consecutive video snippets based on the average set of vectors.

9. The method of claim 1, further comprising:
rendering, via display device, the generated on-demand video to a user;
monitoring, in real-time, via an Artificial Intelligence (AI) model, activities performed by the user in response to viewing the rendered on-demand video;
synchronizing, by the AI model, pace of rendered on-demand videos with the pace of the user in response to the monitoring; and generating, by the AI model, dynamic feedback to the user in response to the user performances.

10. The method of claim 9, wherein synchronizing the pace of the user comprises controlling speed of the user, repeating activities, stopping the activities, or the like.

11. The method of claim 9, wherein the dynamic feedback comprises at least one of:
amount of calories burnt, maximum count of the at least one activity performed, maximum time spent for the at least one activity during a previous activity session of the user, incorrect posture or pace of the user while performing the at least one activity, correct posture or pace of the user to perform the at least one activity, absolute activity performance proficiency of the user, relative activity performance proficiency of the user, or best time taken to perform the at least one activity.

12. A system for generating on-demand videos, the system comprising:
a processor; and
a memory communicatively coupled to the processor, wherein the memory stores processor-executable instructions, which, on execution, causes the processor to:
create a plurality of video snippets from a plurality of videos comprising activities performed by a trainer;
generate a set of input vectors for at least one activity dimension based on a set of predetermined on-demand preferences;
compare for each of the at least one activity dimension, each of the set of input vectors with a set of activity vectors associated with each of the plurality of video snippets;
determine for each of the at least one activity dimension, distance of each of the set of input vectors relative to the set of activity vectors associated with each of the plurality of video snippets;
identify a set of video snippets from the plurality of video snippets, wherein the distance determined for the set of video snippets relative to the set of activity vectors associated with each of the plurality of video snippets is below a first predefined threshold;
combine the set of video snippets based on at least one of the set of predetermined on-demand preferences, wherein combining the set of video snippets comprises:
determining an order of combining the set of video snippets based on predefined criteria;
selecting, for each set of consecutive video snippets in the determined order, a connective video snippet from a set of connective video snippets; wherein selecting the connective video snippet from a set of consecutive video snippet comprises:
determining a first distance of a set of end edge vectors of a preceding video snippet from the set of consecutive video snippet with a set of start edge vectors of each of the set of connecting video snippets;

determining a second distance of a set of start edge vectors of a succeeding video snippet from the set of consecutive video snippet with a set of end edge vectors of each of the set of connecting video snippets; and selecting the connective video in response to comparing the set of end edge vectors of the preceding video snippet and comparing the set of start edge vectors of the succeeding video snippet, wherein an average of the first distance and the second distance is the lowest relative to an average distance computed for the remaining set of connective video snippets; interleaving the connective video snippet between the associated set of consecutive video snippets; and generate an on-demand video based on the combining.

* * * * *